(12) United States Patent
Huang et al.

(10) Patent No.: US 9,574,966 B2
(45) Date of Patent: Feb. 21, 2017

(54) PASSIVE WIRELESS ANTENNA SENSOR FOR STRAIN, TEMPERATURE, CRACK AND FATIGUE MEASUREMENT

(71) Applicant: Board of Regents, The University of Texas System, Austin, TX (US)

(72) Inventors: Haiying Huang, Arlington, TX (US); Jung-Chih Chiao, Grand Prairie, TX (US); Ronald L. Carter, Arlington, TX (US); Uday Shankar Tata, Arlington, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 183 days.

(21) Appl. No.: 14/504,933

(22) Filed: Oct. 2, 2014

(65) Prior Publication Data

US 2015/0015275 A1 Jan. 15, 2015

Related U.S. Application Data

(63) Continuation-in-part of application No. 12/867,801, filed as application No. PCT/US2009/034175 on Feb. 15, 2009, now Pat. No. 8,868,355.

(Continued)

(51) Int. Cl.
*G01N 27/02* (2006.01)
*G01M 5/00* (2006.01)

(52) U.S. Cl.
CPC ......... *G01M 5/0083* (2013.01); *G01M 5/0033* (2013.01)

(58) Field of Classification Search
CPC . G01M 5/0083; G01M 5/0033; G01N 27/025; G01N 27/82; G01B 7/16; H01Q 1/2225
See application file for complete search history.

(56) References Cited

U.S. PATENT DOCUMENTS 6,486,771 B1 * 11/2002 Fuller ................. B60C 23/0408
200/61.22
7,444,878 B1 * 11/2008 Pepples ................... G01L 9/007
73/722

(Continued)

OTHER PUBLICATIONS

Bogosanovich, M., 2000. Microstrip patch sensor for measurement of the permittivity of homogeneous dielectric materials. IEEE Transactions on Instrumentation and Measurement, 49(5), pp. 1144-1148; http://ieeexplore.ieee.org/lpdocs/epic03/wrapper.htm?arnumber=872944.

(Continued)

*Primary Examiner* — Minh N Tang
*Assistant Examiner* — David Frederiksen
(74) *Attorney, Agent, or Firm* — Stephen J. Terrell; Parks IP Law, LLC

(57) ABSTRACT

An apparatus and method is provided for monitoring a condition of a structure using a passive wireless antenna sensor having a known resonant frequency when mounted on the structure. A signal is transmitted with sweeping frequencies around a known resonant frequency to the passive wireless antenna sensor. A signal is received from the passive wireless antenna sensor and a resonant frequency of the passive wireless antenna sensor is determined based on the received signal. The determined resonant frequency is then compared to the known resonant frequency, whereby a change in the resonant frequency indicates a change in the condition of the structure.

20 Claims, 13 Drawing Sheets

Related U.S. Application Data

(60) Provisional application No. 61/029,086, filed on Feb. 15, 2008, provisional application No. 61/950,407, filed on Mar. 10, 2014.

(56) References Cited

U.S. PATENT DOCUMENTS

| | | | | |
|---|---|---|---|---|
| 2002/0154029 | A1* | 10/2002 | Watters | G01D 5/48 340/870.07 |
| 2007/0074580 | A1* | 4/2007 | Fallah-Rad | G01M 5/0008 73/786 |
| 2007/0108973 | A1* | 5/2007 | Lanning | B82Y 25/00 324/240 |
| 2008/0062044 | A1* | 3/2008 | Al-Mahdawi | H01Q 1/2225 343/700 MS |
| 2008/0114255 | A1* | 5/2008 | Schwartz | A61B 8/00 600/474 |
| 2008/0252459 | A1* | 10/2008 | Butler | G06K 7/0008 340/572.1 |
| 2009/0206831 | A1* | 8/2009 | Fermon | G01N 27/9046 324/240 |

OTHER PUBLICATIONS

Chang, K. et al., 2006. Patch antenna using synthesized polyimide for RFID sensing. In Proceedings of the 9th European Conference on Wireless Technology. pp. 83-86.

Denoth, A., 1997. The monopole-antenna: A practical snow and soil wetness sensor. IEEE Transactions on Geoscience and Remote Sensing, 35(5), pp. 1371-1375.

Gagnadre, I., Gagnadre, C. & Fenelon, J.P., 1995. Circular patch antenna sensor for moisture content measurement on dielectric material. Electronics Letters, 31(14), pp. 1167-1168.

McGrath, M.P., Sabouni, R.N. & Pham, A.-V.H., 2004. Development of nano-based resonator gas sensors for wireless sensing systems. In M. S. Islam & A. K. Dutta, eds. SPIE Proc. 5593. pp. 62-72; http://proceedings.spiedigitallibrary.org/proceeding.aspx?articleid=852132 [Accessed Aug. 3, 2014].

Matsuzaki, R., Melnykowycz, M. & Todoroki, A., 2009. Antenna/sensor multifunctional composites for the wireless detection of damage. Composites Science and Technology, 69(15-16), pp. 2507-2513. Available at: http://linkinghub.elsevier.com/retrieve/pii/S0266353809002589 [Accessed Sep. 3, 2014].

* cited by examiner

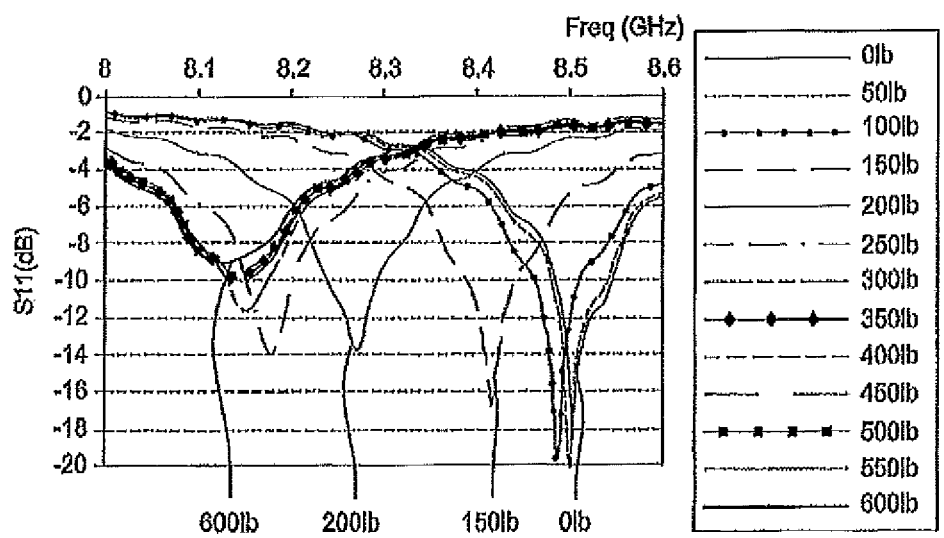
FIG. 16
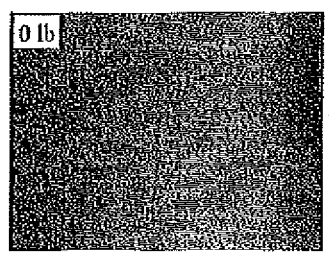 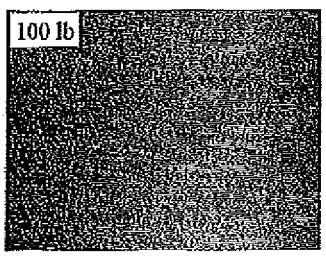 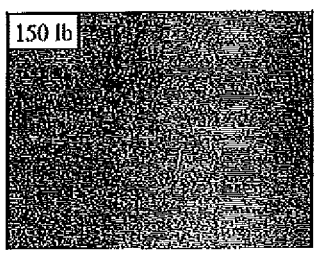
FIG.17A  FIG.17B  FIG.17C
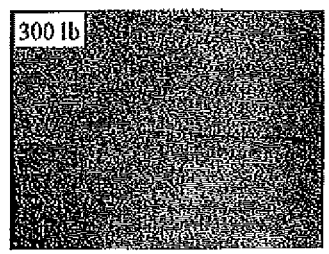 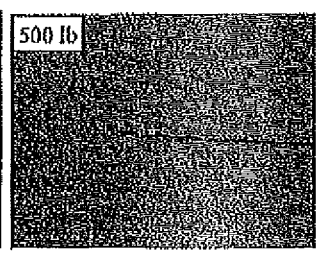
FIG.17D  FIG.17E

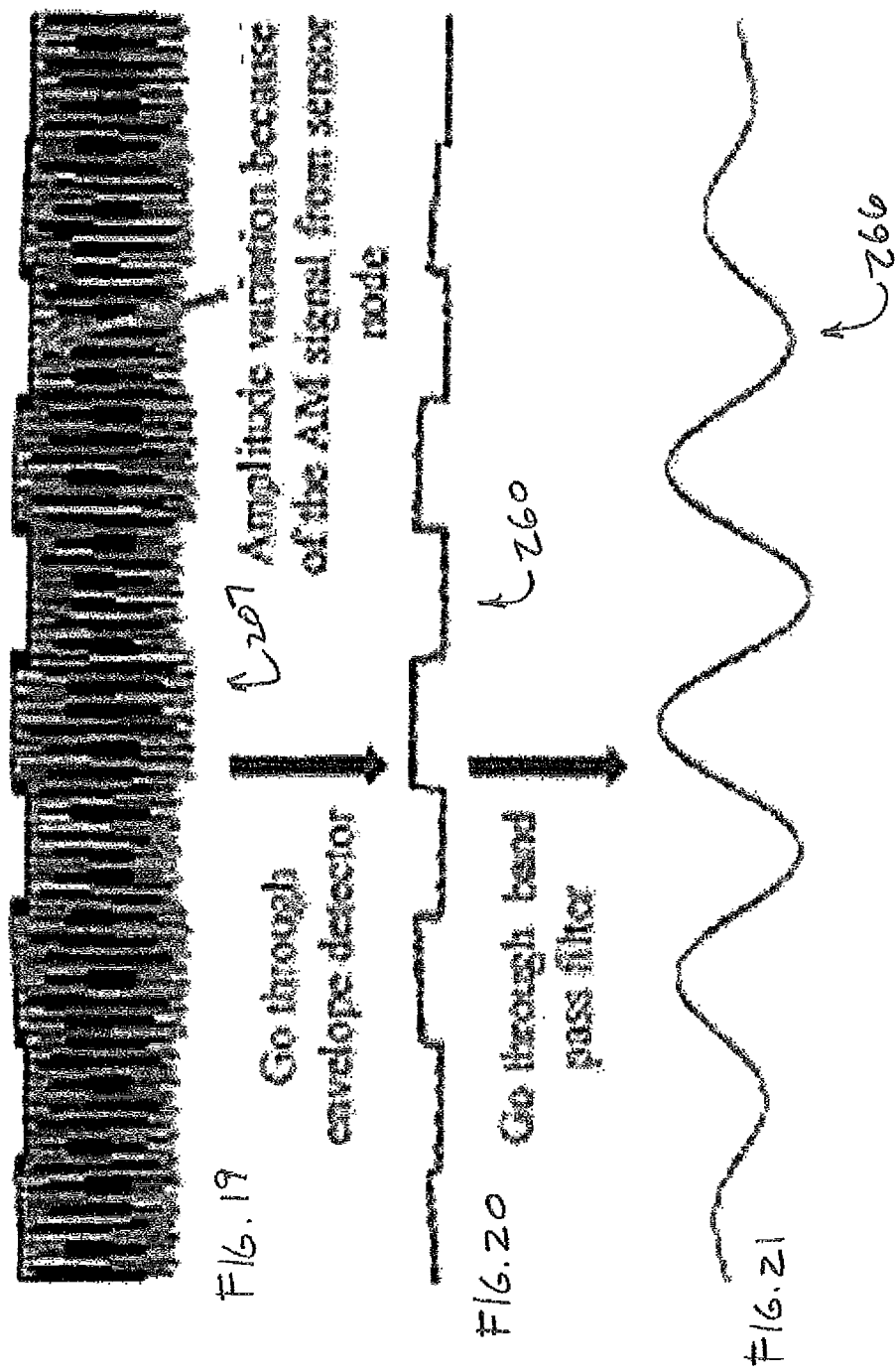

PASSIVE WIRELESS ANTENNA SENSOR FOR STRAIN, TEMPERATURE, CRACK AND FATIGUE MEASUREMENT

CROSS-REFERENCE TO RELATED APPLICATIONS

This application claims priority to U.S. patent application Ser. No. 12/867,801, filed November 2010, which is a U.S. National Phase of PCT Application No. PCT/US2009/034175, filed 15 Feb. 2009, which claims priority to U.S. Provisional Patent Application No. 61/029,086, filed 15 Feb. 2008, the entireties of which are herein incorporated by reference.

This application also claims priority to U.S. Patent Application No. 61/950,407, filed Mar. 10, 2014, the entirety of which is herein incorporated by reference.

STATEMENT REGARDING FEDERALLY-SPONSORED RESEARCH OR DEVELOPMENT

This invention was developed as part of an exploratory project funded by the Air Force Office of Scientific Research (Grant No. FA9550-07-1-0465), a project funded by the Air Force Office of Scientific Research (Grant No. FA9550-08-1-0317), and a project supported by the National Science Foundation (Grant No. CMMI-0846074).

FIELD OF INVENTION

The present invention relates in general to the field of damage detection, and more particularly, to a passive wireless sensor for strain, temperature, crack and fatigue measurement.

BACKGROUND

Without limiting the scope of the invention, its background is described in connection with patch antennas. One system that uses patch antennas is taught in U.S. Pat. No. 7,006,044, issued to Choi, et al., for a microstrip patch antenna using MEMS technology. Briefly, a microstrip patch antenna is formed by using a microelectro-mechanical system fabrication technology. The microstrip patch antenna includes: a substrate provided with a ground formed on a bottom surface of the substrate, a feeding line formed on a top surface of the substrate for feeding an electric power, a coupling stub formed on the top surface of the substrate and electrically connected to the feeding line, a plurality of supporting posts erected on the top surface of the substrate, and a radiating patch formed on the supporting posts, thereby forming an area of air between the radiating patch and the top surface of the substrate.

Another system is taught in U.S. Pat. No. 5,970,393, issued to Khorrami, et al., for an integrated micro-strip antenna apparatus and a system that uses wireless communications for sensing and actuation purposes. Briefly, a system is taught for using a number of micro-strip antenna apparatus embedded in or mounted on the surface of a structure for enabling wireless communication of sensed and actuation signals. The micro-strip antenna apparatus may include smart materials or other substrates. If only a sensed operation is desired, the micro-strip antenna apparatus may be fabricated from only passive elements or materials. Furthermore, a micro-strip antenna apparatus is provided which enables simultaneous transmission/reception of sensing and actuation signals.

Finally, United States Patent Application No. 20070276294, filed by Gupta, et al. (now U.S. Pat. No. 8,070,695, teaches a strain monitoring system and apparatus. Briefly, a system for monitoring strain as an indicator of biological conditions, such as spinal fusion, glucose levels, spinal loading, and heart rate is disclosed. The system includes an inter-digitated capacitor sensor, and RF transmitter, and an associated antenna, all of which are microminiature or microscopic in size and can be implanted in a biological host such as a human or animal. An inductively coupled power supply is also employed to avoid the need for implantation of chemical batteries. Power is provided to the sensor and transmitter, and data is transmitted from the sensor, when an external receiving device, such as a handheld RF ID type receiver, is placed proximate the location of the implanted sensor, transmitter and inductively coupled power supply. The implanted sensor, transmitter and inductively coupled power supply can be left in place permanently or removed when desired.

SUMMARY OF THE INVENTION

Wireless sensor technologies typically consist of two sub-systems, i.e. the wireless sensor node and the wireless interrogator. Recently, microstrip patch antennas have emerged as a promising wireless sensor node for structural health monitoring (SHM) because it is sensitive to strain as well as cracks and can be wirelessly interrogated without a battery.

The present invention can be used to measure one or more parameters, such as strain, temperature, crack, and fatigue, of a wide variety of structures containing metallic, nonmetallic, composite, concrete and even living tissue. More specifically, the present invention can measure: (a) strain in the structure by measuring a frequency shift of the resonant frequency of a passive wireless antenna sensor; (b) temperature change of the structure by also measuring the frequency shift; (c) cracks in the structure by measuring the frequency shift and an increase in return loss; and/or (d) fatigue in the structure by measuring an increase in induced return loss. Several advantages have been found by using passive wireless antenna sensors, including, no external power, small size, low manufacturing cost, low profile, light weight, conformability to surfaces and networking capability.

In one embodiment, the present invention includes a method of monitoring a condition of a structure using a passive wireless antenna sensor having a known resonant frequency when mounted on the structure. A series of radio frequency (RF) signals with sweeping frequencies around the known resonant frequency are transmitted to the passive wireless antenna sensor. The passive wireless antenna sensor includes a dielectric substrate disposed between an antenna pattern and a ground plane such that a change in the condition of the structure will cause a change in one or more characteristics of the passive wireless sensor. A signal is received from the passive wireless antenna sensor and a resonant frequency of the passive wireless antenna sensor is determined based on the received signal. The condition of the structure is monitored by comparing the determined resonant frequency of the passive wireless antenna sensor to the known resonant frequency of the passive wireless antenna sensor. A change in the resonant frequency of the passive wireless antenna sensor indicates a change in the condition of the structure.

In another embodiment, the present invention provides an apparatus for monitoring a condition of a structure that includes a monitoring device and a wireless passive wireless antenna sensor mounted on the structure. The passive wireless antenna sensor has a known resonant frequency when mounted on the structure and includes a dielectric substrate disposed between an antenna pattern and a ground plane such that a change in the condition of the structure will cause a change in one or more characteristics of the passive wireless sensor. The monitoring device transmits a series of radio frequency (RF) signals with sweeping frequencies around the known resonant frequency to the passive wireless antenna sensor. When the monitoring device receives a signal from the passive wireless antenna sensor, it determines a resonant frequency of the passive wireless antenna sensor based on the received signal. The condition of the structure is determined by comparing the determined resonant frequency of the passive wireless antenna sensor to the known resonant frequency of the passive wireless antenna sensor. A change in the resonant frequency of the passive wireless antenna sensor indicates a change in the condition of the structure.

The monitoring device or system interrogation system that measures the resonant frequency of the passive wireless antenna sensors may include an antenna reader with a network analyzer, an antenna reader with a scanning RF source, or a broadband RF source and frequency demodulation. Non-limiting examples of passive wireless antenna sensors include a patch antenna, a loop antenna, or a microstrip antenna. Non-limiting examples of antenna readers for use with the present invention include: a horn antenna, a patch antenna, a loop antenna or a lens antenna. In one aspect, the resonant frequency of the passive wireless antenna sensor is remotely measured by backscattering to detect the return loss as a function of frequency or directly measured by a frequency analyzing apparatus. In one aspect, the structure being monitored is a part of the passive wireless antenna sensor and serves as a ground plane for the passive wireless antenna sensor. The passive wireless antenna sensor resonant frequency may be measured remotely by backscattering or directly using a frequency analyzer. The present invention may also include more than one passive wireless antenna sensor, and at least two passive wireless antenna sensors may have different resonant frequencies.

BRIEF DESCRIPTION OF THE DRAWINGS

Further benefits and advantages of the present invention will become more apparent from the following description of various embodiments that are given by way of example with reference to the accompanying drawings:

FIG. 16 is a graph showing the shift of antenna resonant frequency under with different crack length presented in its ground plane in accordance with the present invention; and FIGS. 17A-E are photos showing a crack opening under different loads in accordance with the present invention.

FIG. 19 shows a signal received by an interrogation horn antenna of the dynamic wireless sensing system of FIG. 18.

FIG. 20 shows an envelope signal that is generated after passing the signal of FIG. 19 through an envelope detector.

FIG. 21 shows the envelope signal of FIG. 20 after it is filtered by a band pass filter.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

As will be described in more detail below, the passive wireless antenna sensor of the present invention can be used to measure one or more parameters, such as strain, temperature, crack, and fatigue, of a wide variety of structures containing metallic, non-metallic, composite, concrete and even living tissue. The monitoring device of the present invention can then measure: (a) strain in the structure by measuring a frequency shift of the resonant frequency of the passive wireless antenna sensor; (b) temperature change of the structure by also measuring the frequency shift; (c) cracks in the structure by measuring the frequency shift and an increase in return loss; and/or (d) fatigue in the structure by measuring an increase in induced return loss. Several advantages have been found by using passive wireless antenna sensors, including, no external power, small size, low manufacturing cost, low profile, light weight, conformability to surfaces and networking capability.

Patch Antenna

Figure 1:
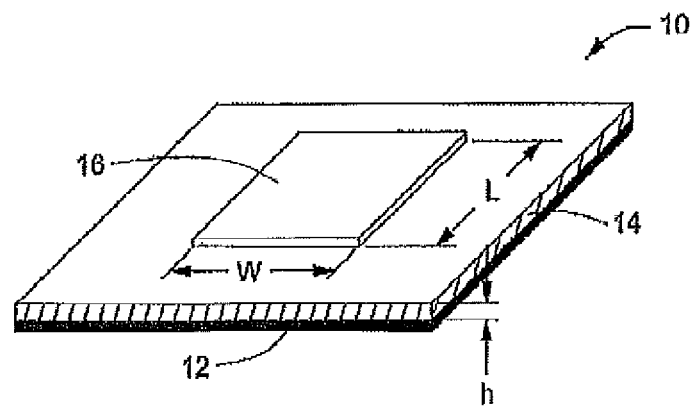
FIG. 1 shows a patch antenna in accordance with the present invention.

Now referring to FIG. 1, a diagram of a typical (passive wireless sensor) patch antenna 10 is shown. The patch antenna 10 is made on a thin sheet of low-loss insulating material, called the dielectric substrate 14. The dielectric substrate 14 is preferably flexible so that the patch antenna 10 can conform to the shape of the structure being monitored.

The antenna pattern can be a metallic patch 16 or a wire/metallic loop printed on one side of the substrate 14. The shape of the antenna pattern can vary depending on the desired operating parameters.

A ground plane 12 is coated on the opposite side of the dielectric substrate 14 from the metallic patch 16. The metallic patch 16 and the ground plane 12 form an electromagnetic (EM) cavity so that a resonance can be generated and the fringing field between the ground plane 12 and the metallic patch 16 can efficiently radiate. Note that the ground plane 12 can be modified or eliminated if the structure on which the patch antenna 10 is to be mounted has a metallic or semi-metallic surface sufficient to function as the ground plane 12.

Passive Wireless Antenna Sensor

Figure 2:
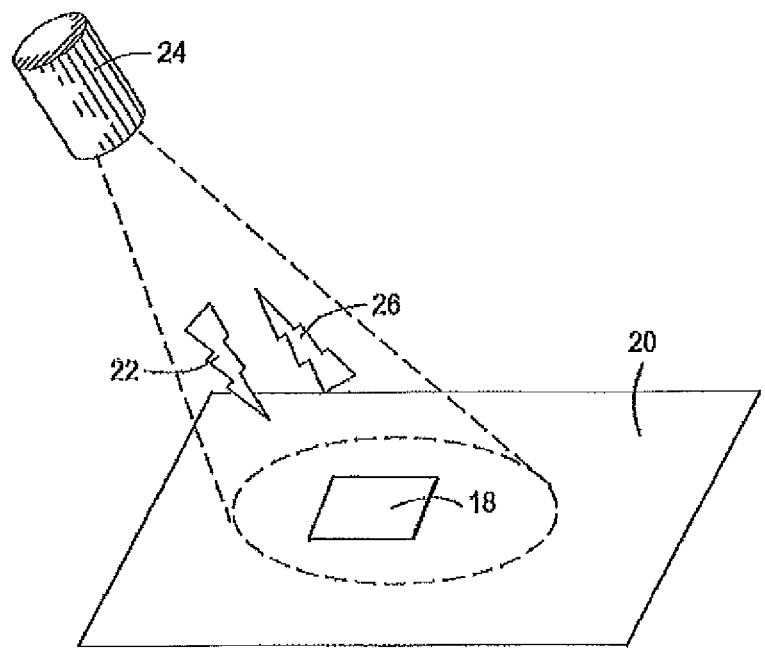
FIG. 2 shows a system for taking antenna measurements using backscattering in accordance with the present invention.

Referring now to FIG. 2, the radiation parameters of a passive wireless antenna sensor 18 can be measured via a non-contact reader, based on the principle of backscattering. The passive wireless antenna sensor 18 can be the patch antenna 10 (FIG. 1), a loop antenna, a microstrip antenna or other suitable antenna.

The passive wireless antenna sensor 18 is mounted on a structure 20 to be monitored, such as a building, bridge, equipment, part of a living body, etc. As previously mentioned, the passive wireless antenna sensor 18 is preferably made of a flexible material so that the passive wireless antenna sensor 18 can conform to the shape of the structure 20 being monitored.

Reader

The passive wireless antenna sensor 18 is placed in the path of a reader 24 (or vice versa) that serves as both the transmitter and the receiver (e.g., a transceiver). The reader 24 is a monitoring device that can be fixed, portable, or handheld. As a transmitter, the reader 24 sends an incident electromagnetic (EM) wave 22 toward the passive wireless antenna sensor 18. Upon interception by the passive wireless antenna sensor 18, the incident EM wave 22 is scattered back as a reflected EM wave 26 by the passive wireless antenna sensor 18 if the frequency of the incident wave matches the resonant frequency of the passive wireless antenna sensor 18.

The backscattered or reflected EM wave 26 is then received by the reader 24. From the amplitude and the frequency of the received EM wave 26, the antenna radiation parameters (resonant frequency, return loss, etc.) can be measured. The reader 24 can be configured to measure the antenna radiation parameters continuously, periodically, randomly or as initiated by a user. Passive wireless antenna sensor 18 return loss is defined as the ratio between the amplitudes of the backscattered EM wave 26 and the incident EM wave 22 while an antenna resonant frequency 28 is defined as the frequency at which the passive wireless antenna sensor 18 has the minimum return loss.

Frequency Response

Figure 3A:
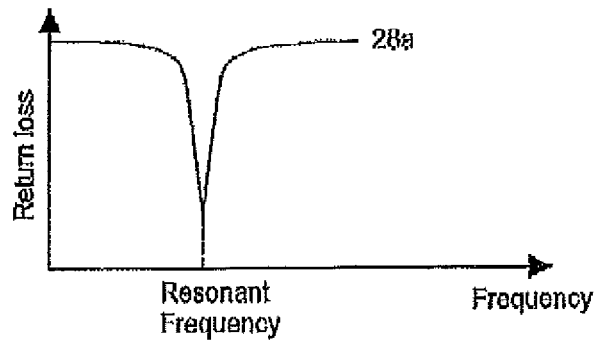
FIGS. 3A-3B are graphs illustrating the detection of cracks from the radiation parameters of a passive wireless antenna sensor in accordance with the present invention.
Figure 3B:
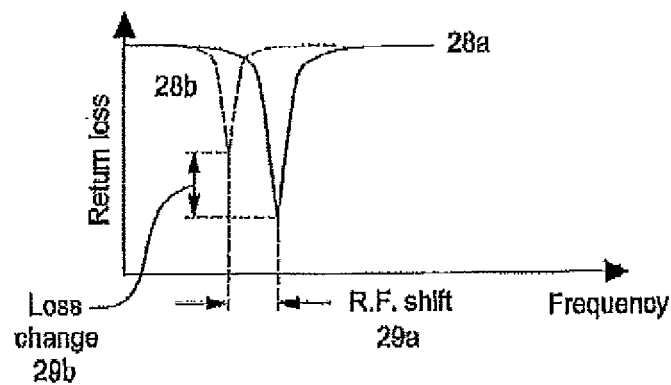

An exemplary return loss versus frequency diagram of the passive wireless antenna sensor 18 is shown in FIGS. 3A and 3B. As shown in FIG. 3A, the passive wireless antenna sensor 18 generally has a narrow bandwidth. Therefore, the passive wireless antenna sensor 18 can only backscatter EM waves 22 whose frequencies fall within a narrow frequency band. Outside of the resonant frequency band, the passive wireless antenna sensor 18 is substantially invisible to the reader 24.

The frequency response of the passive wireless antenna sensor 18 is dependent on the characteristics of the passive wireless antenna sensor 18 including: (a) the dimensions of the passive wireless antenna sensor 18; (b) the dielectric properties of the passive wireless antenna sensor 18 (e.g., substrate 14); (c) the surface roughness of the antenna pattern (e.g., metal patch 16); and (d) the presence of a crack in the ground plane 12 caused by a crack in the structure 20 (or a crack in the metallic structure 20 that is performing the function of the ground plane 12) to which the patch antenna 10 is mounted.

FIG. 3B illustrates two possible modulations of the antenna radiation parameters: (a) resonant frequency shift 29a (change in frequency between a known resonant frequency 28a and a determined (detected) resonant frequency 28b); and (b) a return loss change 29b (change in return loss between a known resonant frequency 28a and a determined (detected) resonant frequency 28b). Note that the known resonant frequency 28a can be: (a) an original resonant frequency 28 of the passive wireless antenna sensor 18 when the passive wireless antenna sensor 18 was mounted on the structure 20; or (b) one or more previously determined resonant frequencies 28 of the passive wireless antenna sensor 18.

The resonant frequency shift 29a can be used for strain measurement and temperature measurement. The resonant frequency shift 29a and return loss change 29b can be used for crack detection. The return loss change 29b can be used for fatigue detection.

Monitoring Device

Now referring both to FIG. 2 and FIG. 3B, an exemplary apparatus and an exemplary method of monitoring a condition of a structure 20 using a passive wireless antenna sensor 18 having a known resonant frequency 28a when mounted on the structure 20 are described in further detail.

A monitoring device (e.g., see those described with respect to FIGS. 8-11 in further detail below), via the antenna reader 24 connected to a radio frequency (RF) source (not shown), transmits a series of radio frequency (RF) signals 22 with sweeping frequencies around the known resonant frequency 28a to the passive wireless antenna sensor 18. The passive wireless antenna sensor 18 includes a dielectric substrate disposed between an antenna pattern and a ground plane such that a change in the condition of the structure 20 will cause a change in one or more characteristics of the passive wireless antenna sensor 18.

The monitoring device, via the antenna reader 24 connected to a frequency detector (not shown), then receives a signal 26 from the passive wireless antenna sensor 18 and determines a resonant frequency 28b of the passive wireless antenna sensor 18 based on the received signal 26.

The determined resonant frequency 28b of the passive wireless antenna sensor 18 is compared to the known resonant frequency 28a of the passive wireless antenna sensor 18. A change in the resonant frequency 28 of the passive wireless antenna sensor 18 indicates a change in the condition of the structure 20. The known resonant frequency 28a, the determined resonant frequency 28b, a change in the resonant frequency (e.g., frequency shift 29a and/or loss change 29b), and other relevant data can be stored and retrieved from a data storage device.

Moreover, the monitoring device can notify a user of the change in condition of the structure 20 or when new data is received. Similarly, the monitoring device can notify a user of the change in condition of the structure 20 only when the change in resonant frequency exceeds a threshold value.

Sensing Network

Multiple Sensing Elements

A single passive wireless antenna sensor 18 can only detect local cracks developed in the vicinity of the antenna, which requires a priori knowledge of the crack location. Unfortunately, in areas with a complex geometry and stress distribution, the exact locations where small cracks will emerge are impossible to predict due to the stochastic nature of the crack initiation process.

Figure 4:
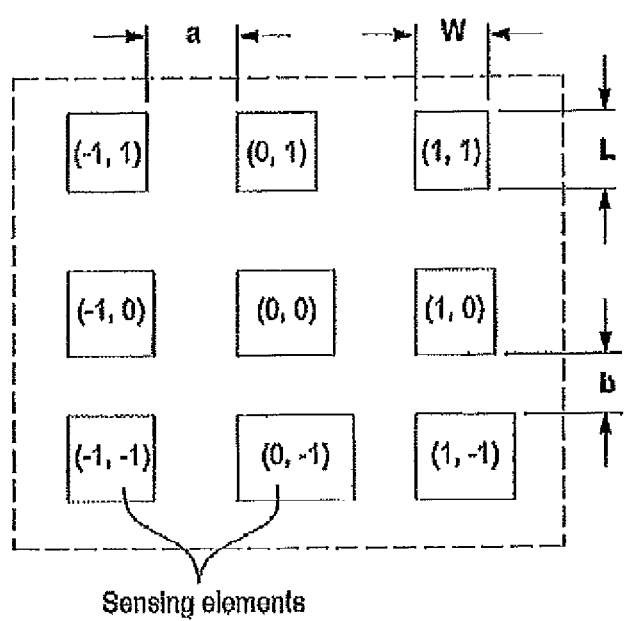
FIG. 4 shows an antenna sensing network in accordance with the present invention.

Because the crack locations are unknown in advance, a sensing network or array patterned with multiple sensing elements (i.e., passive wireless antenna sensors 18) can be employed to provide distributed sensing capabilities over a large area. A diagram of the antenna sensing network is shown in FIG. 4.

The distances between the antenna sensors 18 and the sizes of the antenna sensors 18 are on the order of several millimeters. A properly designed network of antenna sensors 18 will be able to detect any cracks longer than 1 mm, regardless of their locations.

Each passive wireless antenna sensor 18 will function independently and has its unique transmission bands. The passive wireless antenna sensors 18 within the network or array are individually addressable and frequency division is used to multiplex the signals to the passive wireless antenna sensors 18. As a result, each passive wireless antenna sensor 18 has a different known resonant frequency 28a.

Note that tunable passive wireless antenna sensors can be used. For example, a passive wireless antenna sensor 18 can be made to be tunable by fabricating a crack in the ground plane and attaching a mechanical actuator to the ground plane to open or close the fabricated crack.

Crack Detection

Figure 5A:
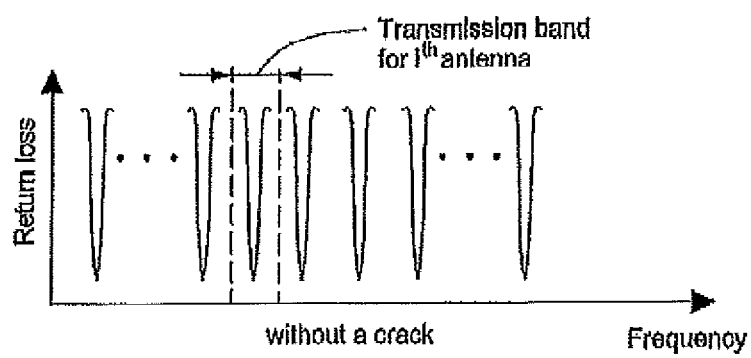
FIGS. 5A and 5B are graphs illustrating the multiplexing of the passive wireless antenna sensor using frequency division and the detection of cracks using an antenna sensing network in accordance with the present invention.
Figure 5B:
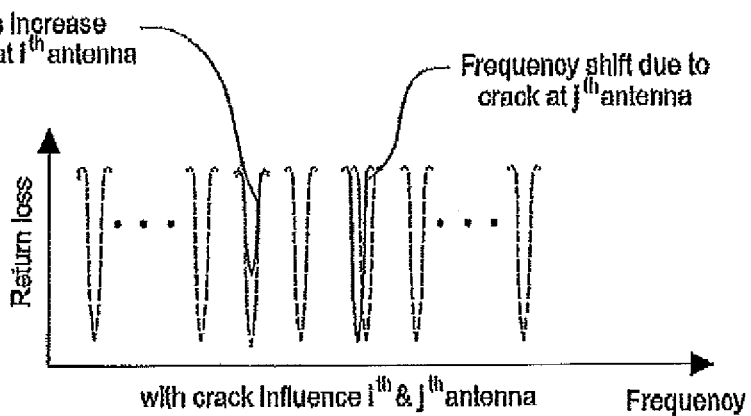

Now referring to FIGS. 5A-5B, graphs illustrating the detection of cracks using an antenna sensing network are shown. As shown in FIG. 5A, the entire spectrum of the sensing network is a concatenation of the transmission bands of the individual antenna sensors 18. The resonance frequencies 28 and the return losses of the antenna sensors 18 are interrogated using a wave reader 24 that scans the entire spectrum of the sensing network.

Before a crack emerges, the sensing network serves as a full-field strain gauge that measures strain-induced elongation of the antenna sensor 18 at the antenna locations. Once cracks are developed in the primary structure 20, the antenna sensors 18 directly above these small cracks will be able to measure the crack length from the corresponding frequency shift (see FIG. 5A).

The difference between resonant frequency shift 29a due to elongation and due to small cracks is that the elongation induced frequency shifts 29a are most likely to be continuous across several adjacent antenna sensors 18 while the crack induced frequency shift 29a is more likely to be limited to the antenna sensor 18 directly above the crack. As the crack length increases, the return loss of the antenna sensor 18 covering the crack will increase dramatically (FIG. 5B).

Eventually, when the crack length is comparable to the width of the antenna sensor 18, the return loss has increased to such a level that the antenna sensor 18 can no longer radiate. At this point, the antenna sensor 18 is damaged. Since each antenna sensor 18 operates independently, damaging one antenna sensor 18 will not interrupt the functionality of the other antenna sensors 18.

For a crack spanning several antenna sensors 18, the orientation and the length of the crack can be determined from a cluster of antenna sensors 18 whose radiation parameters are altered. In addition, two cracks are considered to be interacting when their crack-tip plastic zones start to join up. By monitoring the surface roughness induced return loss increases, it is feasible to detect the onset of crack interaction.

Strain Measurement

Strain measurement will now be described. Based on the transmission line model, the resonant frequency of a rectangular patch antenna 10 is calculated as:

$$f_r = \frac{c}{2\sqrt{\varepsilon_{re}}} \frac{1}{L + 2\Delta L_{oc}}. \quad \text{Equation (1)}$$

The effective dielectric constant $\varepsilon_{re}$ is related to the dielectric constant of the substrate $\varepsilon_r$, the substrate thickness h, and the patch width w, i.e., $$\varepsilon_{re} = \frac{\varepsilon_r + 1}{2} + \frac{\varepsilon_r - 1}{2\sqrt{(1 + 10h/w)}}. \quad \text{Equation (2)}$$

The line extension $\Delta L_{oc}$ is calculated from the effective dielectric constant $\varepsilon_r$, the substrate thickness h, and the patch width w, $$\Delta L_{oc} = 0.412h \frac{(\varepsilon_{re} + 0.3)(w/h + 0.264)}{(\varepsilon_{re} - 0.258)(w/h + 0.813)}. \quad \text{Equation (3)}$$

Assuming the patch antenna 10 is subjected to a tensile strain $\varepsilon_L$ along the length direction, the patch width and the substrate thickness will change due to Poisson's effect, i.e.

$$w = (1 - \upsilon_p \varepsilon_L) w_0, \text{ and } h = (1 - \upsilon_s \varepsilon_L) h_0. \quad \text{Equation (4)}$$

If the Poisson's ratios of the metallic patch and the substrate material, $v_p$ and $v_s$, are the same, the ratio w/h remains to be a constant as the tensile strain $\in_L$ changes, which means that $\in_{re}$ in Equation (2) is independent of $\in_L$ and $\Delta L_{oc}$ in Equation (3) is proportional to the substrate thickness h. Therefore, the resonant frequency in Equation (1) can be expressed as:

$$f_r = \frac{c}{2\sqrt{\varepsilon_{re}}} \frac{1}{L+2\Delta L_{0c}} = \frac{C_1}{L+C_2 h}, \quad \text{Equation (5)}$$

where:

$$C_1 = \frac{c}{2\sqrt{\varepsilon_{re}}};$$

and $$C_2 = 0.812 \frac{(\varepsilon_{re}+0.3)(w/h+0.264)}{(\varepsilon_{re}-0.258)(w/h+0.813)}.$$

The strain-induced elongation, therefore, will shift the antenna resonant frequency. At an unloaded state, the antenna frequency $f_{ro}$ is calculated from the antenna length $L_o$ and substrate thickness $h_o$:

$$f_{ro} = \frac{C_1}{L_0+C_2 h_0}. \quad \text{Equation (6)}$$

Under a strain $\in_L$, the antenna frequency shifts to $$f_r(\varepsilon_L) = \frac{C_1}{L_0(1-\varepsilon_L)+C_2 h_0(1-v\varepsilon_L)}. \quad \text{Equation (7)}$$

Combining Equation (6) and (7), the relationship between the strain $C_L$ and the frequency shift can be established $$\varepsilon_L = -\frac{L_0+v_s C_2 h_0}{L_0+C_2 h_0} \frac{\Delta f}{f_{r0}+\Delta f} = C \frac{\Delta f}{f_{r0}+\Delta f}, \quad \text{Equation (8)}$$

where $\Delta f = f_r - f_{ro}$. Analyzing the constant C indicates that the sensitivity of frequency shift to the applied strain is strongly governed by the dielectric constant of the substrate material.

Crack Detection

Crack detection will now be described. A crack that develops in the ground plane 12 of the patch antenna 10 will shift the resonant frequency (e.g., resonant frequency shift 29a) and change the return loss (e.g., loss change 29b) of the patch antenna 10. Therefore, surface cracks in the structures 20 can be characterized by two mechanisms, depending on whether the material is conductive or not.

If the structure 20 is made of metallic material, the structure 20 itself can serve as the ground plane 12 for the patch antenna 10; therefore, surface cracks developed in the structure 20 will be detected as cracks in ground plane 12 almost immediately after crack initiation. If the structure 20 is made of non-conducting materials, however, the crack will be detected only after it causes a crack in the ground plane 12 of the patch antenna 10.

Fatigue Monitoring

Fatigue monitoring will now be described. In addition to strain-induced elongation and ground plane cracks, it is well known to the antenna designers that the patch antenna 10 return loss (e.g., return loss change 29b) increases if the surface roughness of the patch antenna 10 metallic components increases. Since plastic deformations cause surface roughening in metallic materials, a patch antenna 10 experiencing plastic deformations in its metallic elements may display a large return loss. This increase in surface roughening-induced return loss can be exploited for plastic deformation characterization.

Temperature Measurement

Temperature measurement and sensing for other parameters will now be described. The same sensing principle can be applied for measurement of other physical parameters that will change the dimension of the patch antenna 10 or dielectric property of the material of the substrate 14. For example, temperature can be measured either from the change in a dimension of the patch antenna 10 due to thermal expansion/contraction or from the change of conductivity of the material of the substrate 14 at extremely high temperatures.

Frequency Response Vs. Strain for a Patch Antenna

Now briefly referring back to FIG. 1, a passive wireless antenna sensor 18 using an exemplary patch antenna 10 for strain measurement will now be described. A rectangular patch antenna 10 of 8 mm in length and 4 mm in width is designed to operate at 20 GHz. The metallic patch 16 in this example is fabricated from copper on a flexible substrate 14 (here, Kapton polyimide film) by conventional IC fabrication processes (such as, but not limited to photolithography, deposition, and liftoff). The thickness of the exemplary substrate 14 is 50 μm and the thickness of the metallic patch 16 is 1 μm. The patch antenna 10 was attached to a test specimen with its feed soldered to a SubMiniature version A (SMA) connector.

The patch antenna 10 was tested under tension to evaluate whether the copper film of the metallic patch 16 will remain intact under loading. It has been observed that microcracks start to develop in the copper film when the strain was increased to 5%.

In this example, the structure 20 is an aluminum cantilever test specimen that is designed to have a strain of 1% at the location of the antenna sensor 18 when it is subjected to a 50 pound load. The patch antenna 10 was bounded to the structure 20 using a conventional strain gauge epoxy. Briefly, one end of the cantilever is clamped to a workbench and the other end of the cantilever is loaded by a weight. The SMA connector of the patch antenna 10 is connected to a network analyzer (e.g., network analyzer 82 described in further detail below). An $S_{11}$ scattering parameter was measured to determine the frequency response of the patch antenna 10.

Figure 6:
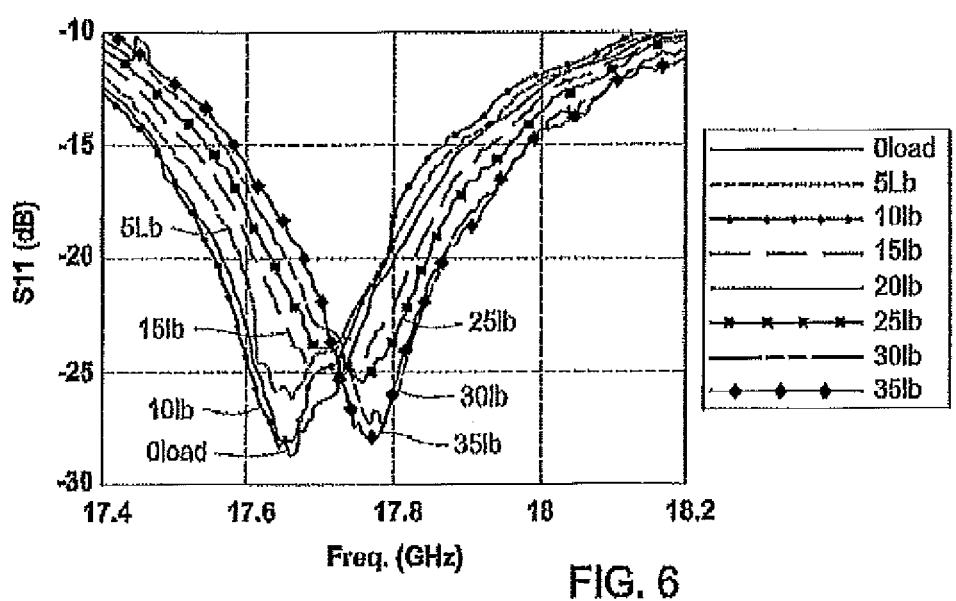
FIG. 6 is a graph showing the frequency versus return loss characteristics at different loadings/strains in accordance with the present invention.

Referring now to FIG. 6, the patch antenna 10 was loaded in increments of 5 lbs. (which corresponds to 0.1% strain increase) until the total load reached 35 pounds. FIG. 6 shows the frequency vs. return loss characteristics of the patch antenna 10 under the different loadings. Based on the theoretical analysis of the patch antenna 10, the resonant frequency of the patch antenna 10 should decrease linearly with an increase in its dimension. As a result, the frequency response of the patch antenna 10 should shift to the left if a tensile strain is applied to the patch antenna 10. The results shown in FIG. 6 clearly demonstrate the parallel shifts of the antenna frequency response as the applied load increases.

The measurements were repeatable up to 1% strain, the maximum strain applied to the structure 20.

Figure 7:
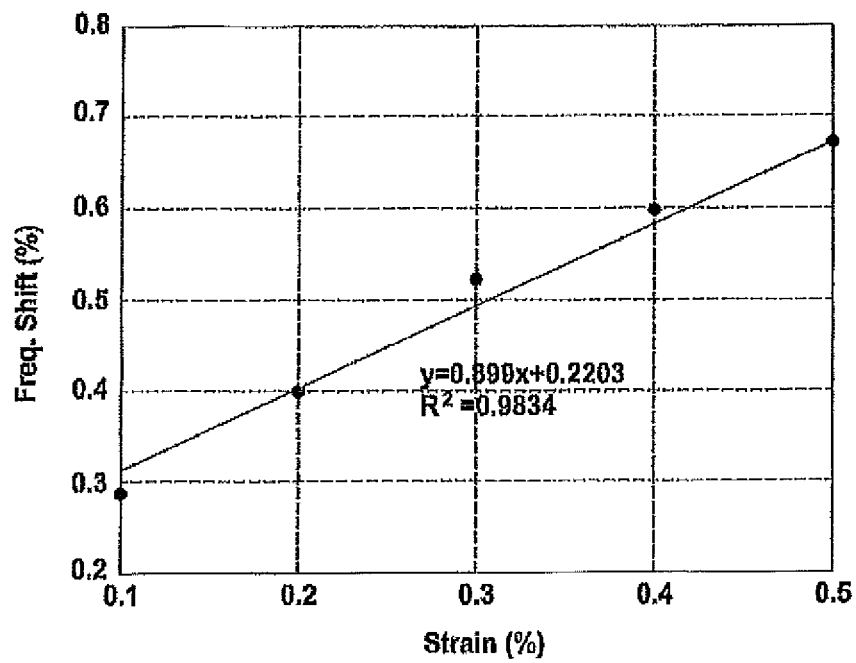
FIG. 7 is a graph showing the strain versus relative frequency change of a passive wireless antenna sensor in accordance with the present invention.

Now referring to FIG. 7, the relationship between the shift in resonant frequency (%) (e.g., resonant frequency shift 29a divided by known resonant frequency 28a) and the applied strain is shown. First, the resonant frequency 28 of the patch antenna 10 under zero loading is calculated from the frequency response of the patch antenna 10. The shifts of the frequency response (e.g., resonant frequency shift 29a) under different loadings were obtained by interpolating the frequency values at a particular return loss value. Based on the linear fitting of the data, the sensitivity of the strain sensor calculated to be 15 kHz/microstrain. The sensitivity can be increased further by designing the patch antenna 10 to operate at a higher resonant frequency.

Interrogation System

Figure 8:
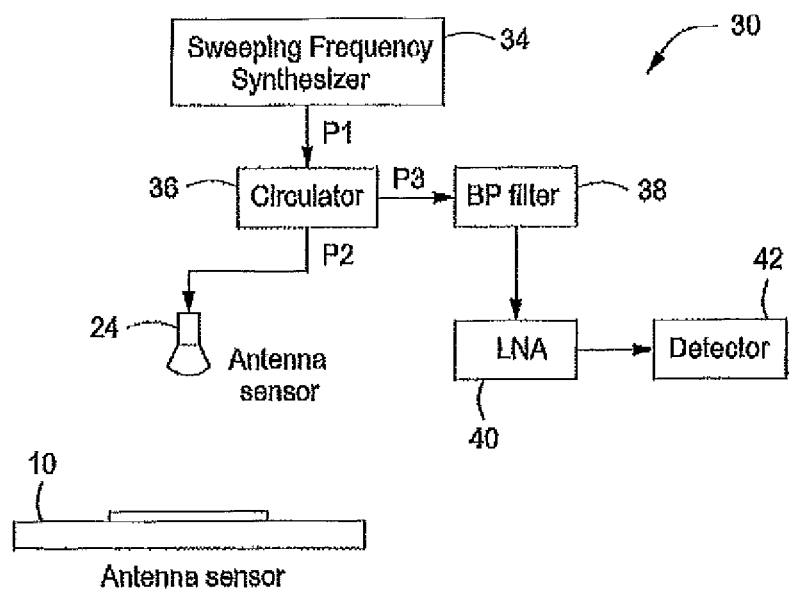
FIG. 8 shows a passive wireless antenna sensor resonant frequency measurement system in accordance with the present invention.

Referring now to FIG. 8, a passive wireless antenna sensor interrogation system 30 can be used to wirelessly measure the resonant frequency shift 29a of the passive wireless antenna sensor 18. Passive wireless antenna sensor 18 can be the patch antenna 10 (FIG. 1), a loop antenna, a microstrip antenna or other suitable antenna.

A sweeping frequency synthesizer 34 generates a series of RF signals with a sweeping frequencies centered at the resonance frequency 28 of the unloaded passive wireless antenna sensor 18 through a circulator 36. An antenna reader 24 includes a transceiver that transmits and detects a signal from the passive wireless antenna sensor 18, and the data is then sent to a band-pass filter 38, after which the backscattered signal will be amplified at low noise amplifier (LNA) 40 and detected by a RF power detector 42.

Only when the transmitting signal matches with the resonant frequency of patch passive wireless antenna sensor 18 under test will the detector 42 receive a large backscattered signal. At other frequencies, only noise is detected.

Because the patch passive wireless antenna sensor 18 has a very high Q value, the resolution of the frequency measurement systems is likely to be determined by the resolution of the sweeping frequency synthesizer 34, which can be as small as 0.01 Hz. Therefore, the patch passive wireless antenna sensor 18 is expected to have super-high strain sensitivity.

Radio System

Figure 9:
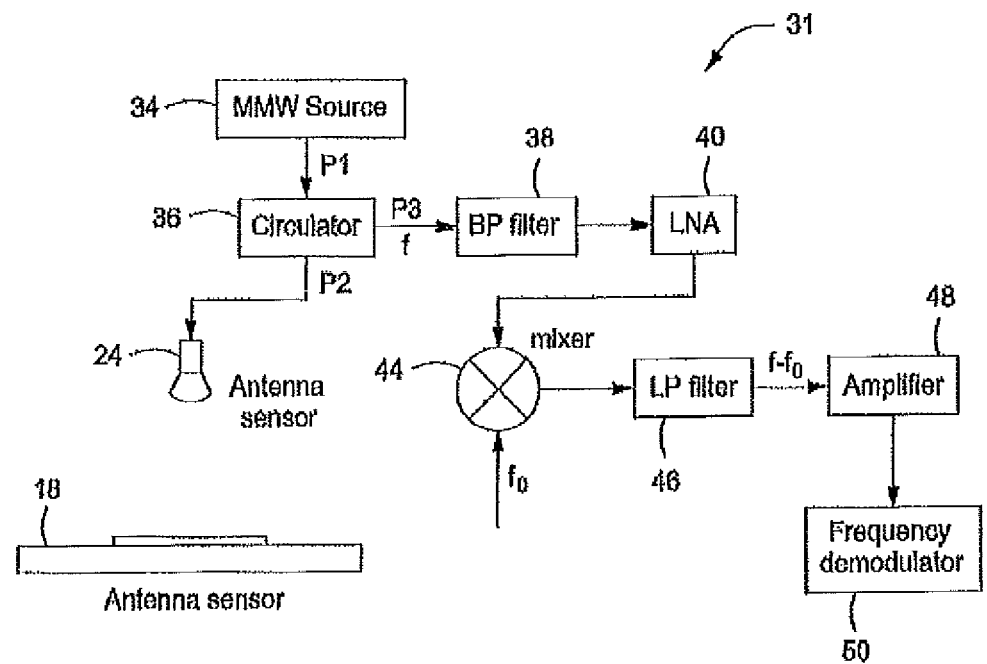
FIG. 9 shows an antenna resonant frequency measurement using a radio system in accordance with the present invention.

Alternatively, a radio system 31 can be used to measure the resonant frequency shift 29a of the passive wireless antenna sensor 18 at high speed, as shown in FIG. 9. In this example, the backscattered signal can be down-converted to a lower frequency signal by mixing it with a reference signal that has the same frequency as the resonant frequency of the unloaded passive wireless antenna sensor.

A sweeping frequency synthesizer 34 generates a series of RF signals with a sweeping frequencies centered at the resonance frequency 28 of the unloaded passive wireless antenna sensor 18 through a circulator 36. An antenna transceiver 24 transmits and detects a signal from the passive wireless antenna sensor 18. The signal is then sent to a band-pass filter 38. After amplifying the filtered signal with a Low Noise Amplifier (LNA), the received signal is mixed with the reference signal to produce a low frequency intermediate frequency (IF) signal. The frequency shift will be in the range of zero to a few hundred Mega-Hertz.

A conventional RF frequency demodulator 50 can then be employed to measure this frequency shift 29a, which can easily achieve a frequency resolution of a few kilo-Hertz. In this embodiment, the signal is mixed at a mixer 44, sent into low-pass filter 46, amplified at an amplifier 48, and then into a frequency demodulator 50.

Bistatic Measurement Systems

Figure 10:
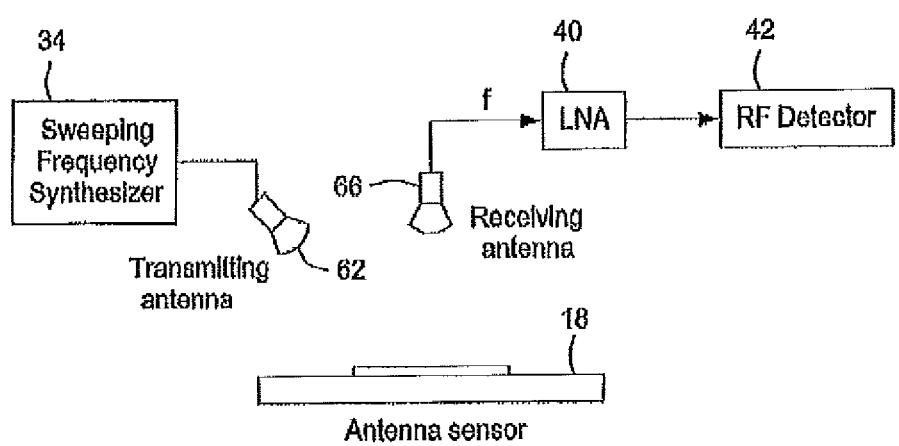
FIG. 10 shows a bistatic passive wireless antenna sensor resonant frequency measurement system in accordance with the present invention.
Figure 11:
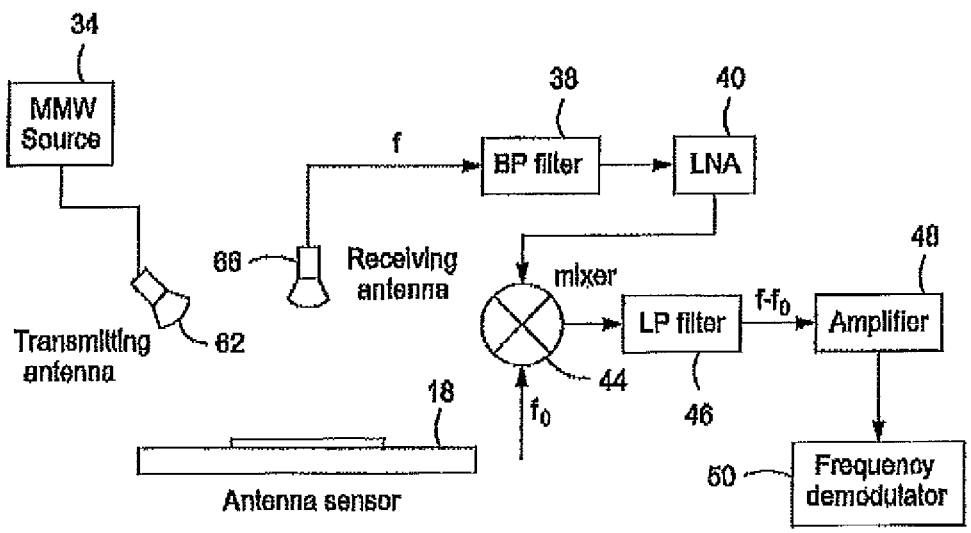
FIG. 11 shows an antenna resonant frequency measurement using a bistatic radio system in accordance with the present invention.

The two monostatic measurement systems shown in FIGS. 8 and 9 can be replaced with their respective bistatic measurement systems as shown in FIG. 10 and FIG. 11, in which two antennas 62, 66 are employed, one for transmitting and one for receiving. Referring to FIG. 10, transmitting antenna 62 is connected to a sweeping frequency synthesizer 34. The signal strikes the passive wireless antenna sensor 18 and the reflected signal arrives at receiving antenna 66, which then sends the signal into the low noise amplifier 40 and into the RF detector 42.

Alternatively, two antennas 62, 66 are also shown in FIG. 11. In this case, the signal is processed as in FIG. 9, in which the signal passes through band-pass filter 38 into mixer 44 and sent into low-pass filter 46, amplified at amplifier 48 and finally into frequency demodulator 50.

Experimental Setup

Figure 12:
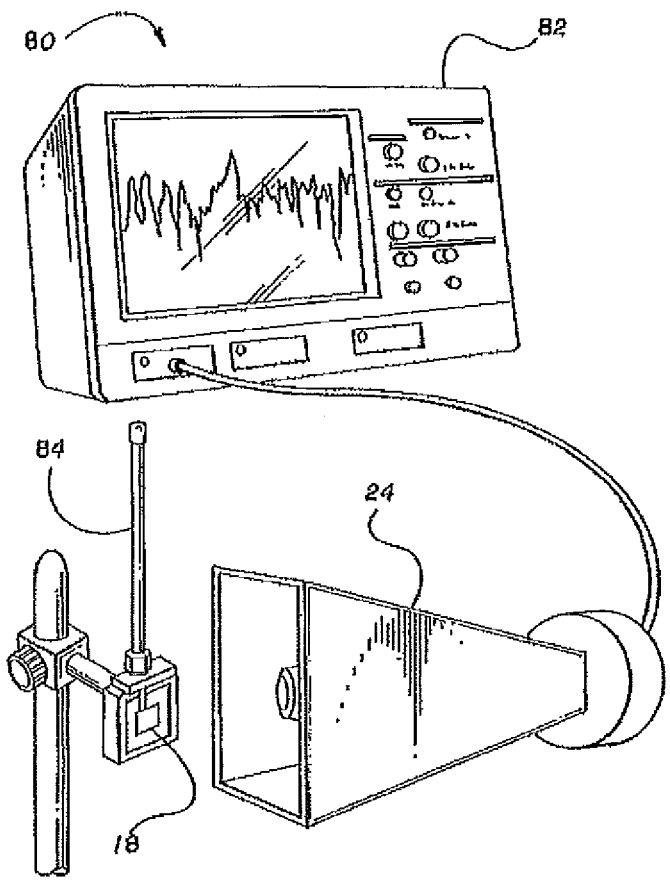
FIG. 12 shows a wireless interrogation passive wireless antenna sensor in accordance with the present invention.

An experimental setup 80 for wireless interrogation of the passive wireless antenna sensor 18 will now be described in reference to FIG. 12. The passive wireless antenna sensor 18 is placed at a distance of twelve inches from the antenna reader 24, which is a broadband horn antenna. The radio frequency (RF) signal 22 (see FIG. 2) generated by a Vector Network Analyzer (VNA) 82 is transmitted to the antenna reader 24 via a coax cable. This RF signal 22 is subsequently broadcasted to the passive wireless antenna sensor 18 by the antenna reader 24.

The signal 26 (see FIG. 2) backscattered by the passive wireless antenna sensor 18 consists of two modes: the antenna scattering mode and the structure scattering mode. The antenna scattering mode is the reradiating of the signal received by the passive wireless antenna sensor 18. It has the same frequency as the radiation spectrum of the passive wireless antenna sensor 18. The structure scattering mode is the signal that is reflected by the ground plane 12 and the surrounding structures 20 of the passive wireless antenna sensor 18.

Because the structure scattering mode is much stronger than the antenna scattering mode, it is difficult to determine the resonant frequency of the passive wireless antenna sensor 18 from the backscattered signal 26 if spectrum analysis is performed on the backscattered signal 26 directly. In order to separate the antenna scattering mode from the structure scattering mode, a short cable 84 is connected to the passive wireless antenna sensor 18 to introduce a small delay between the antenna mode and structure mode.

The signal received by the passive wireless antenna sensor 18 propagates in the cable 84 first. If the cable 84 is open, this received signal is reflected back at the end of the cable 84 and is reradiated by the passive wireless antenna sensor 18. The signal is delayed by the time it travels in the cable 84.

Signal Processing

Figure 13:
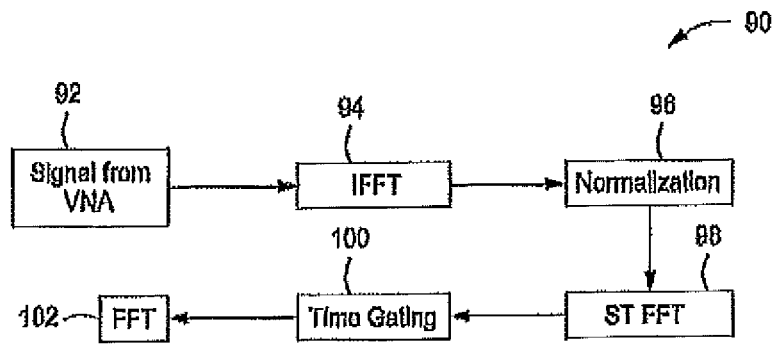
FIG. 13 shows a block diagram of a procedure for signal processing in accordance with the present invention.

In order to determine the resonant frequency 28 of the passive wireless antenna sensor 18 from the backscattered signal 26, digital signal processing is needed. The procedure 90 for performing this data processing is shown in FIG. 13.

The frequency domain backscattered signal 92 recorded by a VNA is converted to time domain first using Inverse Fast Fourier Transformation (IFFT) 94. To increase the signal-to-noise ratio, the time-domain signal is also subtracted with the time-domain signal collected when the passive wireless antenna sensor 18 is not present or the time-domain signal when the cable 84 is connected to a matched load (normalization 96). Short Time Fast Fourier Transformation (ST FFT) 98 is then performed on the normalized signal 96 and its spectrogram is plotted.

Figure 14A:
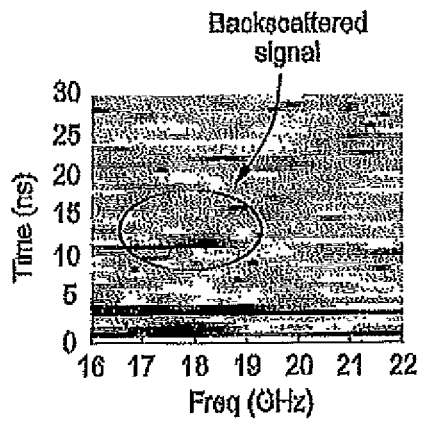
FIGS. 14A-C are graphs showing signal processing to determine the resonant frequency of passive wireless antenna sensor from the backscattered signal in accordance with the present invention.

The multi-resolution spectrogram presents the frequency components of the normalized signal in both time domain and in frequency domain, as shown in FIG. 14A. At the beginning (0~3 ns), the signal is mainly contributed from the reflection within the horn antenna 24. The signal from 3-5 ns is from the structure scattering term and the signal from 10-15 ns is the signal backscattered by the passive wireless antenna sensor 18.

Figure 14B:
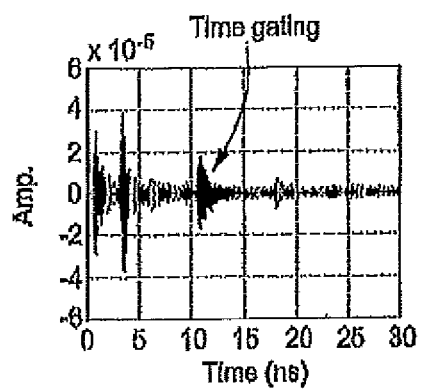
Figure 14C:
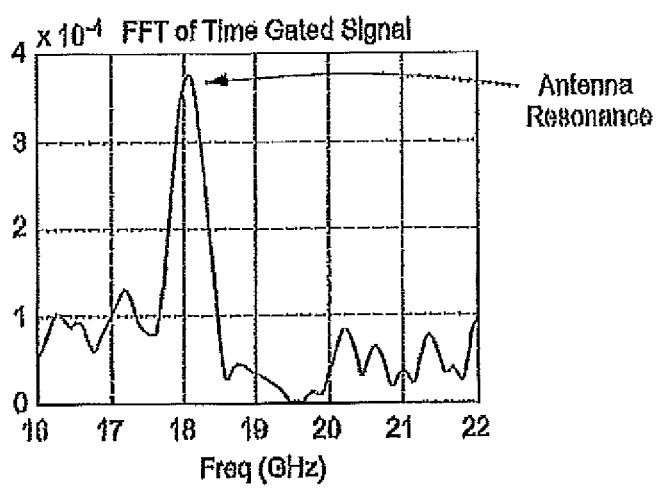

The delay between the structure mode and the antenna mode is around 6 ns, which is approximately the same as the time it takes the received signal to travel round trip in the three foot cable 84. After the time at which the passive wireless antenna sensor 18 scattering term occurs is determined from the spectrogram, the time-domain signal is time gated 100 using a Hanning window (see FIG. 14B). Fast Fourier Transformation (FFT) 102 is then performed on the time gated Hanning windowed signal 100 and the resonant frequency 28 of the passive wireless antenna sensor 18 can be determined (see FIG. 14C). It is contemplated that the cable 84 can be replaced with a delay line incorporated in the antenna design.

As described above, the backscattered signal can be isolated by time gating the received signal as described above. Using time gating to acquire the antenna resonant frequency, Inverse Discrete Fourier Transform (IDFT) is applied to the time gated signal, which needs a large number of sampling points to obtain high frequency resolutions. For a wireless antenna sensor operating in the gigahertz frequency, the frequency resolution obtained using IDFT need to be relatively high to be sufficient for strain measurements.

Experimental Setup

Figure 15:
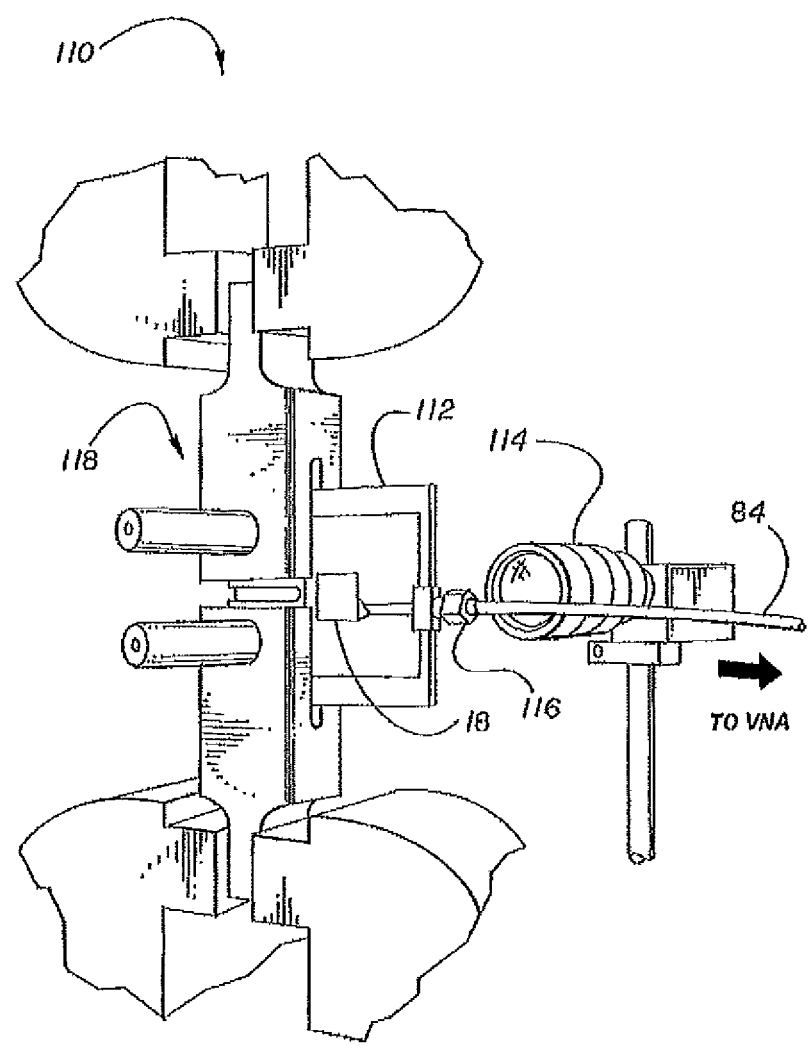
FIG. 15 shows a setup for crack detection using a passive wireless antenna sensor in accordance with the present invention.

The passive wireless antenna sensor's capability to detect cracks was evaluated using the experiment setup 110 shown in FIG. 15. The specimen 112 is a pre-cracked fatigue sample with the passive wireless antenna sensor 18 bonded on top of the crack, covering the end of the crack. A digital camera 114 was used to inspect the crack opening. The passive wireless antenna sensor 18 is connected to the vector network analyzer (VNA) via a suitable coupling mechanism such as the SMA connector 116 that is shown. Load was applied to the fatigue specimen 112 at increments of 50 lbs. using a mechanical tester 118.

The shift of the resonant frequency 28 of the passive wireless antenna sensor 18 with the applied loads is shown in FIG. 16. From 0-100 lb., the resonant frequency 28 only shifted slightly. This is because the crack did not open much at low loads (see FIGS. 17A-E) and the frequency shift is mainly due to strain increase. As shown in FIGS. 17B, 17C and 17D, the crack gradually opened up from 100 lb. to 300 lb. As a result, the resonant frequency 28 shifted significantly to lower frequencies. After 300 lb., the crack is fully opened as shown in FIG. 17D (300 lb.) and FIG. 17E (500 lb.). The shift of the resonant frequency 28 from 300-600 lb. is again due to strain increase, which is much smaller than the resonant frequency 28 shifts induced by crack opening.

Wireless Interrogators

Wireless interrogators 30 that step the interrogation frequency at an increment and construct the frequency response of the wireless antenna sensor 18 by measuring the backscattered signal 26 at each frequency step can achieve much higher frequency resolution than the time-gating technique.

As described in further detail below, a high frequency impedance switch is implemented in a sensor node to modulate the amplitude of antenna backscattering. A down conversion RF mixer is used at the wireless interrogator to demodulate the amplitude modulated (AM) antenna sensing signal. The antenna resonant frequency is determined by stepping the interrogation frequency and establishing the relationship between the amplitude of the demodulated signal and the interrogation frequency.

Another wireless interrogation system uses the radio-frequency identification (RFID) technology. An RFID chip is implemented into the antenna sensor circuitry and the antenna resonant efficiency was measured from the time that takes to charge the RFID energy harvesting chip.

A tunable harmonic re-radiator can also be used for wireless interrogation. After the sensor node receives the interrogation signal, the re-radiator transmits the second harmonic of the received signal back to the interrogation antenna. The information from the antenna sensor can then be acquired from this harmonic signal.

A transmitter switch can also be introduced. After sending a pulse signal to the wireless sensor node, the wireless interrogator was switched to the receiving mode. Due to the high quality factor of the resonator sensor, the resonator sensor will resonate long after the structure backscattering is dissipated.

All of these techniques use a small frequency increment in order to achieve a fine frequency resolution, which limits the interrogation speed of the wireless interrogator. These wireless interrogators are suitable for static sensing.

Dynamic Wireless Sensing System

Figure 18:
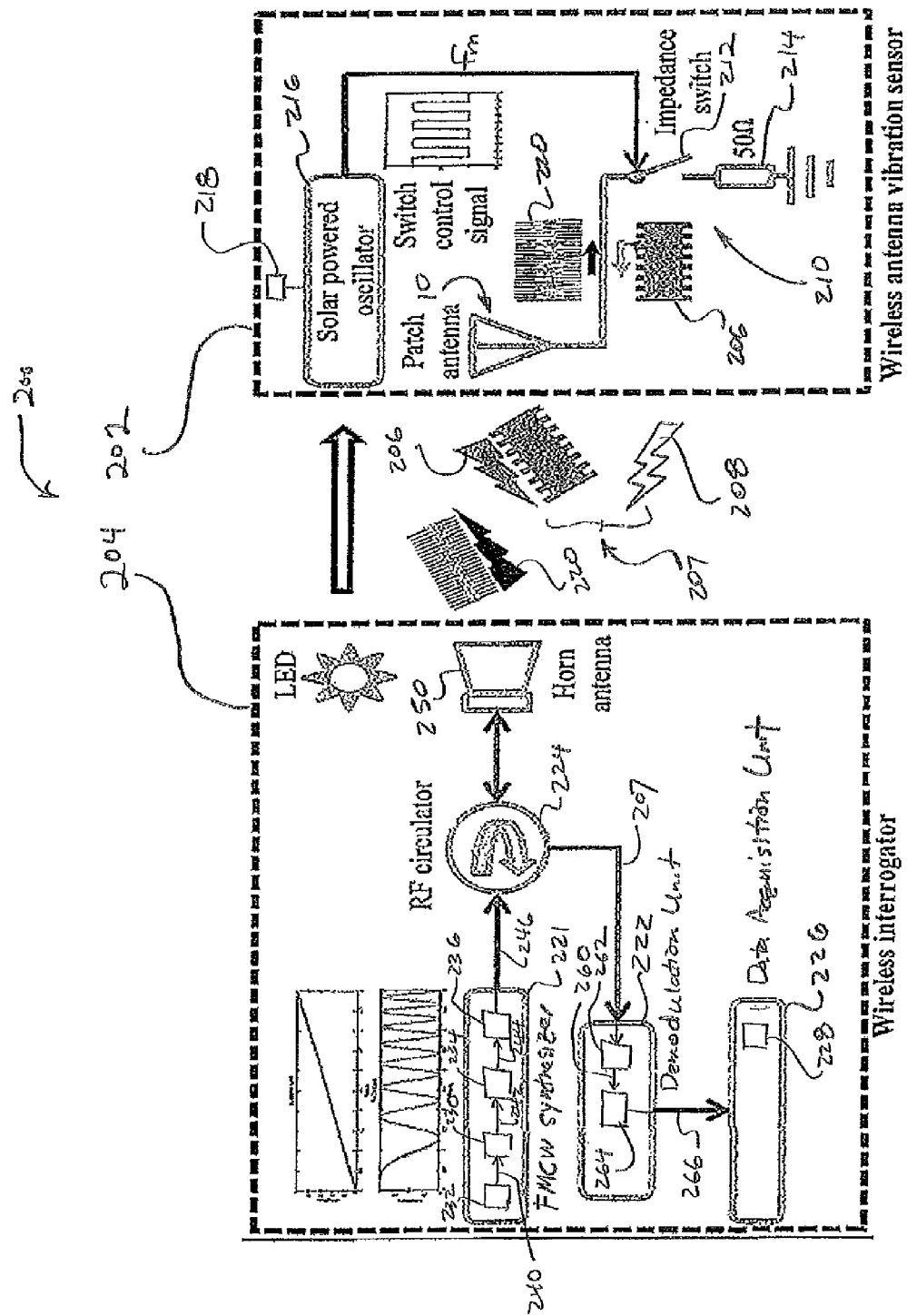
FIG. 18 shows an exemplary embodiment of a dynamic wireless sensing system.

Continuous vibration monitoring is important in structural health monitoring applications because excessive vibrations could generate fluctuating stresses that lead to fatigue failures. Referring to FIG. 18, a dynamic wireless sensing system 200 is configured to achieve dynamic interrogation of a wireless antenna sensor 202 for dynamic measurement, such as mechanical vibration monitoring. The dynamic wireless sensing system 200 includes a wireless antenna sensor 202 and a wireless interrogator 204. The dynamic wireless interrogation system 204 remotely interrogates the wireless antenna sensor 202 at high speeds and thus broadens the application of the passive wireless antenna sensors 202 and paves the way to achieve passive wireless structural health monitoring.

Dynamic Wireless Antenna Sensor

The antenna sensor 202 includes the microstrip patch antenna 10 that serves a sensing as well as a communication function. The microstrip patch antenna 10 acts as both a strain sensing device and a wireless transceiver. For example, a rectangular patch antenna 10 with a resonant frequency 28 of 5.4 GHz can be designed using a high frequency substrate material (see FIG. 3A).

Strain changes the dimensions of the antenna sensor 202, which in turn changes the antenna resonant frequency 28. This strain-induced antenna resonant frequency 28 is encoded in the antenna backscattering 206 by the antenna sensor 202.

A received signal 207 received by the wireless interrogator 204 includes the antenna backscattering 206 and background clutter 208. In order to separate the antenna backscattering 206 from the background clutter 208, a circuit 210 modulates the amplitude of the antenna backscattering 206. The circuit 210 includes a microwave switch 212 and a load 214 (e.g., 50 Ohm) at the sensor node. The switch 212 is controlled by the output of an oscillator 216.

An exemplary AM circuit 210 is now described in further detail. A pseudomorphic High Electron Mobility Transistor (pHEMT) can be used as the impedance switch 212. The "gate" terminal of the pHEMT 212 is connected to the oscillator 216. The oscillator 216 is powered by a solar cell 218 and produces a square wave of 0-1 Volts (e.g., a "gate voltage" oscillates between 0 V and 1 V) at a frequency, for example, of 32.78 kHz.

When the gate control voltage is high, the "drain" and "source" terminals of the pHEMT 212 are connected. As such, most of an interrogation signal 220 received by the antenna sensor 202 is absorbed by the load 214 (e.g., a 50 Ohm resistor). On the other hand, if the gate voltage is low, the path between the "drain" and "source" terminals of the pHEMT 212 is cut off. As a result, the patch antenna 10 is terminated with an open circuit and all of the received interrogation signal 220 will be reflected back as antenna backscattering 206.

An exemplary implementation of the antenna sensor 202 includes the patch antenna 10 positioned at the center of an aluminum beam and bonded on the beam surface with super glue. The pHEMT 212 can be installed on the substrate of the antenna sensor 202 and a terminator 214 can be used as the load 214 (e.g., 50 Ohm). A microstrip transmission line can be designed to match the impedance between the pHEMT 212 and the terminator 214. An energy source, such as the solar cell 218 or a RF energy harvester, can be implemented on a circuit board to supply power for the oscillator 216.

The periodic switching of the pHEMT 212 therefore results in amplitude modulation of the antenna backscattering 206. By controlling the switch 212 using the output of the oscillator 216, the amplitude of the antenna backscattering 206 is modulated with a modulation frequency $f_m$ of the output of the oscillator 216. The frequency of the antenna backscattering 206 is therefore offset by the modulation frequency $f_m$ and thus is separated from an interrogation signal 220 in the frequency domain.

In addition, the antenna resonant frequency 28 is also encoded in the amplitude modulated (AM) antenna backscattering 206. When the interrogation signal 220 includes a frequency (referred to as an "interrogation frequency") that matches the antenna resonant frequency 28, the AM antenna backscattering 206 has the largest amplitude. The AM antenna backscattering 206 amplitude reduces as the interrogation frequency is very different from the antenna resonant frequency 28.

After calibrating the antenna sensor 202 response using static tensile tests, dynamic interrogation of the wireless antenna sensor 202 can be carried out by subjecting it to a sinusoidal tensile load. The resonant frequency 28 shifts of the antenna sensor 202 were compared with the strains calculated from applied loads. For example, a sampling rate of up to 50 Hz was demonstrated.

Dynamic Wireless Interrogator

The wireless interrogator 204 is now described in further detail. The wireless interrogator 204 includes a Frequency Modulated Continuous Wave (FMCW) synthesizer 221, a signal demodulation unit 222, a RF circulator 224, a data acquisition (DAQ) device 226, and a real-time digital signal processing program 228.

The wireless interrogator 204 interrogates the resonant frequency 28 of the antenna sensor 202 at high speeds. The amplitude modulated sensing signals 207 received by the wireless interrogator 204 usually include both the antenna backscattering 206 (also referred to as the sensing signal) and the background clutter 208. In order to measure the antenna resonant frequency 28 dynamically, the wireless interrogator 204 acquires and processes the amplitude modulated sensing signals 207 at a high speed.

FMCW Synthesizer

The wireless interrogator 204 uses a Frequency Modulated Continuous Wave (FMCW) synthesizer 221 for dynamic wireless interrogation of the antenna sensor 202. One of the functions of the wireless interrogator 204 is to generate the FMCW interrogation signal 220. For example, the FMCW synthesizer 221 includes a voltage control oscillator (VCO) 230, a signal generator 232, a frequency multiplier 234, and a microwave amplifier 236.

For example, a periodical "sawtooth" wave 240 is generated by the signal generator 232 and is supplied to the VCO 230 as the control voltage. The frequency multiplier 234 doubles the frequency of the VCO output 242 so that the frequency can be swept around the antenna resonant frequency. Finally, the frequency multiplier output 244 is amplified by the microwave amplifier 236, for example, to achieve an amplitude, for example of 25 dB, after which a FMCW signal 246 is broadcast to the wireless antenna sensor 202 by a horn antenna 250 as the interrogation signal 220.

In order to validate the linear relationship between the frequency of the FMCW signal 246 and the control voltage 242, the control voltage 242 of the VCO 230 can be supplied from a DC supply and the multiplier output 244 can be acquired using an oscilloscope. Using an FFT function of the oscilloscope, the output frequencies of the multiplier 234 at different control voltages can be measured. A linear relationship between the frequency of the output of the multiplier 234 and the control voltage can be represented by a trend line. For example, the voltage to frequency ratio can be measured from the slope of a trend line as 0.232 GHz/V.

The FMCW signal 246 is a frequency modulated signal whose frequency is rapidly changed during measurement. Linear chirp is an example of a FMCW signal 246. A linear chirp signal is a signal in which the carrier frequency is linearly varied over time and the frequency sweeps through a range of values continuously and rapidly. For example, a chirp signal generated by the FMCW 221 is linearly proportional to the "sawtooth" wave and sweeps from the minimum frequency to the maximum frequency during each period of the "sawtooth" wave.

Since the interrogation frequency (e.g., the frequency range of the interrogation signal 220) is swept continuously and the amplitude modulated sensing signal 207 (e.g., due to the antenna backscattering 206 backscattered by the antenna sensor 202) is frequency dependent, the amplitude of the envelope of amplitude modulated sensing signal 207 varies continuously with time. The antenna resonant frequency 28 of the antenna sensor 202 can then be detected from the envelope of the amplitude modulated sensing signal 207.

Demodulation Unit

To demodulate the amplitude modulated sensing signal 207, the amplitude modulated sensing signal 207 is first directed to the demodulation unit 222 by the RF circulator 224. The demodulation unit 222 recovers the envelope 260 of the amplitude modulated sensing signal 207 using an envelope detector 262.

Since the envelope 260 of the amplitude modulated sensing signal 207 varies at a frequency of $f_m$, a band pass filter 264 with a narrow bandwidth centered at $f_m$ can then be applied to remove the noises (e.g., the background clutter 208) and produce a filtered envelope 266 of the amplitude modulated sensing signal 207.

After acquiring the filtered envelope 266 using the DAQ device 226, the Digital Signal Processing (DSP) program 228 can be applied to track a time-varying amplitude of the filtered envelope 266. Correlating the time-varying amplitude and the time-frequency relationship of the FMCW frequency synthesizer 221 produces an amplitude-frequency curve 268.

Since the frequency of the interrogation signal 220 varies linearly with time, the amplitude of the filtered envelope 266 in the time domain is the same as the amplitude of the amplitude-frequency curve 268 in the frequency domain. The time of the filtered envelope 266 is synced with the frequency of the amplitude frequency curve 268 according to the tuning relationship between time and frequency as established by the FMCW synthesizer 221. Particularly, by synchronizing the filtered envelope 266 with the tuning of the FMCW synthesizer 221, an antenna resonant frequency shift can be detected from the change in frequency at a reference amplitude of the amplitude-frequency curve 268. Strain variation can be determined from the frequency shift.

The signal at different stages of the demodulation process can be seen in FIGS. 19-21. The amplitude modulated sensing signal 207 shown in FIG. 19 is the signal received by the interrogation horn antenna 250. Since the background clutter 208 is independent of the interrogation frequency, the amplitude of the background clutter 208 should remain substantially constant. The slight amplitude variation of the amplitude modulated sensing signal 207 is therefore contributed by the amplitude modulated antenna backscattering 206.

The amplitude modulated sensing signal 207 is passed through the envelope detector 262 to produce the envelope 260 shown in FIG. 20. As mentioned before, the amplitude of the envelope 260 is determined by the relationship between the frequency of the interrogation signal 220 and the antenna resonant frequency 28.

The amplitude of the square wave envelope 260 varies with time. The envelope 260 filtered by the band pass filter 264 is shown in FIG. 21. Since the band pass filter 264 was set to have a narrow bandwidth with the center frequency matching the oscillator 216 output frequency $f_m$, the output of the band pass filter 264 is the filtered envelope 266 with continuously varying amplitude.

Since the frequency of the interrogation signal 220 (also referred to as "interrogation frequency") is linearly proportional to time, the variation of the amplitude of the filtered envelope 266 with time represents the variation of the antenna backscattering 206 with the interrogation frequency. By acquiring the filtered envelope 266 shown in FIG. 21 using a high frequency oscilloscope, a real-time digital signal processing (DSP) algorithm 228 can be applied to extract the strain information from the amplitude variation of the filtered envelope 266.

Real-Time Data Processing

Figure 22:
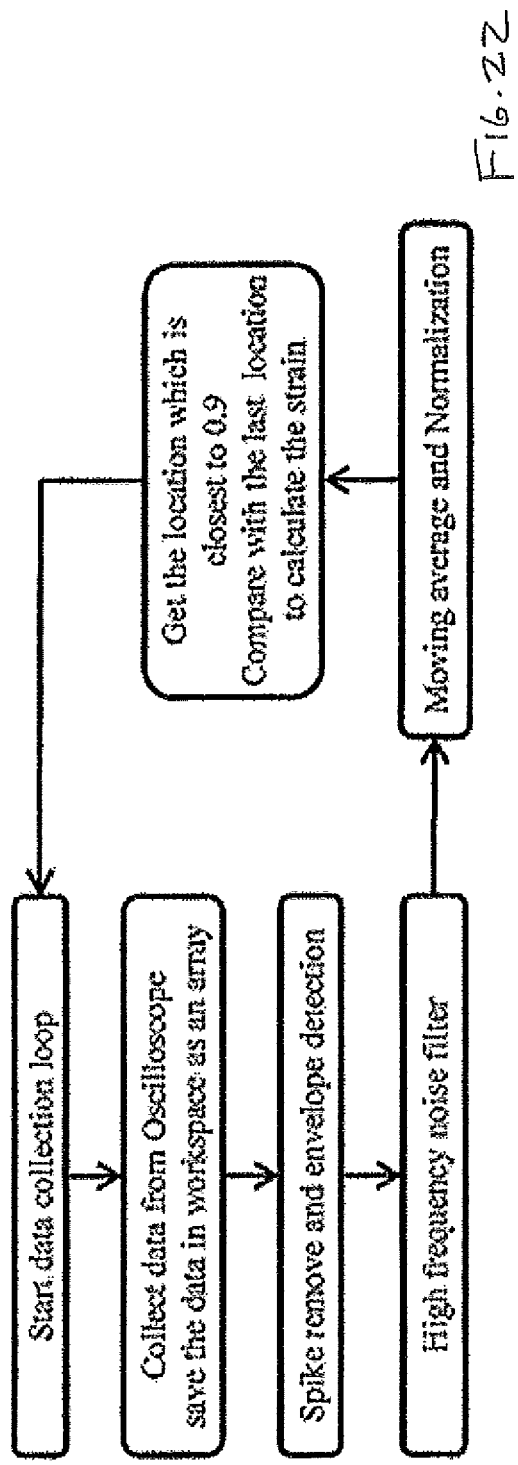
FIG. 22 shows a flow chart of a digital signal processing algorithm.

A flowchart of the DSP algorithm 228 is shown in FIG. 22. First, the amplitude modulated sensing signal 207 is segmented based on a trigger signal of the FMCW control signal 246. Each segmented amplitude modulated sensing signal 207 is saved as a data array that corresponds to one FMCW period. The first 5% of the data points in each array can be ignored if the transition of the FMCW signal 246 from high frequencies to low frequencies generates noise.

The digital envelope detector 262 was then applied to the segmented amplitude modulated sensing signal 207 to detect the envelope 260 of the segmented amplitude modulated sensing signal 207. The envelope 260 was then sent to a second order Butterworth low pass filter 264 with a cutoff frequency, for example, of 10 KHz. After filtering, a moving average can be applied to the filtered envelope 266. Using the time to frequency conversion of the FMCW synthesizer, the filtered envelope 266 is converted to the amplitude-frequency curve 268. Finally, the amplitude of the amplitude-frequency curve 268 is normalized with respect to the maximum value in of the amplitude-frequency curve 268. The maximum amplitude represents the resonance frequency of the antenna sensor 202. This normalized amplitude-frequency curve 268 represents the amplitude variation of the envelope 260 of the antenna backscattering 206 with the time varying interrogation frequency.

In order to detect the shift between a first amplitude-frequency curve 268a and a second amplitude-frequency curve 268b, a reference amplitude 274 is selected. For example, the reference amplitude 274 is set at 0.9. Such a reference amplitude 274 may be used because the frequency of the highest peak of the amplitude frequency curve 268 can be more difficult to locate than a frequency at an amplitude that is off-peak.

The interrogation frequency of the amplitude-frequency curve 268 whose normalized amplitude value is closest to 0.9 is selected. For example, interrogation frequency 280 is selected for first amplitude-frequency curve 268a and interrogation frequency 282 is selected for second amplitude-frequency curve 268b.

Since the interrogation frequency of the amplitude-frequency curve 268 is proportional to time, an interrogation frequency difference 290 between the reference interrogation frequency value (e.g., interrogation frequency 282) in the current FMCW cycle (e.g., second amplitude-frequency curve 268b) and the reference interrogation frequency value (e.g., interrogation frequency 280) in the previous FMCW cycle (e.g., amplitude-frequency curve 268a) represents the antenna resonant frequency shift (e.g., resonant frequency shift 29a), from which the strain experienced by the specimen can be calculated from the calibrated antenna sensor 202 response.

Figure 24:
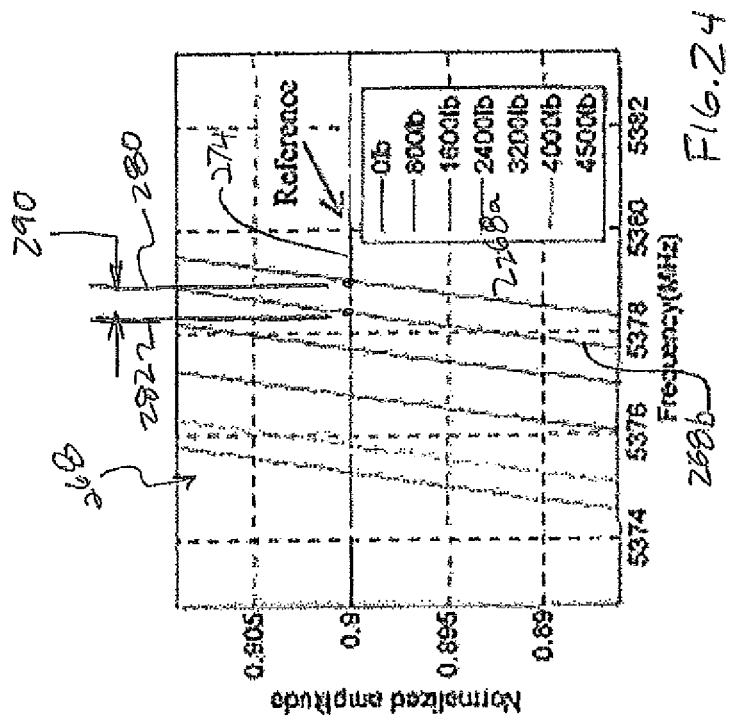
FIG. 24 shows a zoomed-in view of FIG. 23.
Figure 23:
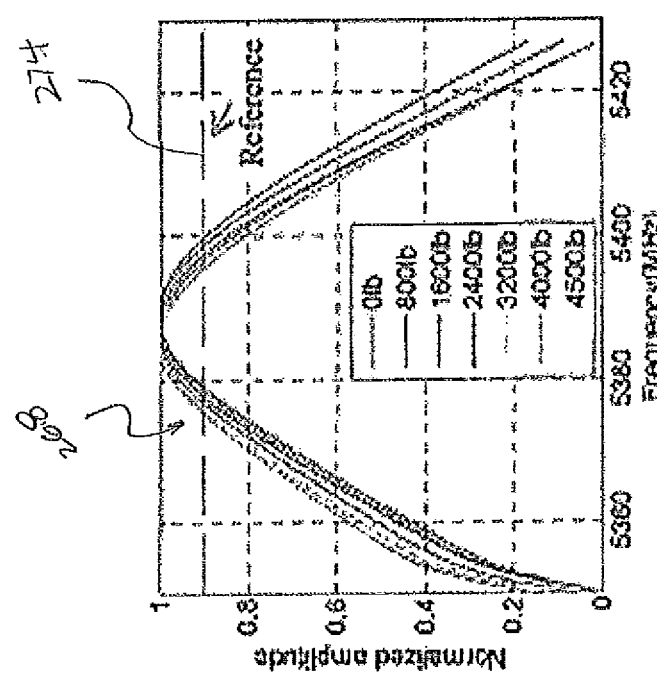
FIG. 23 shows normalized envelopes of the envelope signal associated with various loads.

Normalized amplitude-frequency curves 268 for a load variation of 0 lb. to 4500 lb. are shown in FIG. 23. For example, FIG. 23 is a zoomed view of the highest peak of the filtered envelope 266 with the time values of the filtered envelope 266 converted to frequency values. Again, the tensile strains shift the amplitude-frequency curve 268 to the left. The parallel shifts of the antenna resonant frequency 28 with the increased loadings are evident in a zoomed view shown in FIG. 24. To correlate the frequency shift (%) to the applied strain, for example, the normalized amplitude of 0.9 is selected as a reference amplitude and the frequency shifts 290 at different loads were measured.

Dynamic interrogation of the wireless antenna sensor 202 was demonstrated. For example, according to an exemplary dynamic test, a sinusoidal tensile load with a load frequency of 2 Hz was applied to the specimen. The load was varied from a minimum of 500 lb. to a maximum of 3500 lb. during the tests.

Unlike slower interrogation techniques, the FMCW based wireless interrogator 204 can detect the antenna resonant frequency shift 290 at a sampling rate of 50 Hz. An excellent linearity between the wirelessly acquired antenna frequency shift 290 and the applied strain was demonstrated during static tests. The dynamic tests reveal that the wirelessly acquired strain measurements matched the frequency and amplitude of theoretical predictions.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

The invention claimed is:

1. A method of monitoring a condition of a structure, comprising:
   transmitting, at a first time, an interrogation signal to a passive wireless antenna sensor mounted on the structure, wherein the interrogation signal includes frequencies in a frequency range, wherein the frequency range includes a resonant frequency of the passive wireless antenna sensor, wherein the passive wireless antenna sensor is configured such that a change in the condition of the structure will change the resonant frequency;
   receiving a first backscattered signal, wherein the first backscattered signal comprises an antenna backscattered signal from the passive wireless antenna sensor and a structure backscattered signal from the structure, wherein the antenna backscattered signal is modulated by the passive wireless antenna sensor at a modulated frequency;
   detecting a first envelope of the first backscattered signal;
   normalizing the first envelope;
   selecting a reference amplitude;
   determining a first frequency of the first envelope that is associated with the reference amplitude;
   transmitting, at a second time, the interrogation signal to the passive wireless antenna sensor mounted on the structure;
   receiving a second backscattered signal, wherein the second backscattered signal comprises an antenna backscattered signal from the passive wireless antenna sensor and a structure backscattered signal from the structure, wherein the antenna backscattered signal is modulated by the passive wireless antenna sensor at a modulated frequency;
   detecting a second envelope of the second backscattered signal;
   normalizing the second envelope; determining a second frequency of the second envelope that is associated with the reference amplitude;
   determining a frequency shift based on a difference between the first frequency and the second frequency; and
   determining the condition of the structure based on the frequency shift.

2. The method of claim 1, wherein the frequency shift represents a change in the resonant frequency of the passive wireless antenna sensor.

3. The method of claim 2, wherein the change in the resonant frequency indicates the change in the condition of the structure.

4. The method of claim 1, wherein the frequency of the interrogation signal increases over time.

5. The method of claim 4, wherein the frequency of the interrogation signal increases linearly over time.

6. The method of claim 1, wherein the change in the condition of the structure includes a change in strain on the structure.

7. The method of claim 6, wherein the change in strain is calculated based on the frequency shift.

8. The method of claim 1, further comprising applying a band pass filter to the first envelope and the second envelope.

9. The method of claim 1, further comprising converting the first envelope to a first amplitude-frequency curve and converting the second envelope to a second amplitude-frequency curve.

10. The method of claim 1, further comprising converting each of the first envelope and the second envelope from a time domain to a frequency domain.

11. An apparatus for monitoring a condition of a structure, comprising: a transmitting device that is configured to transmit an interrogation signal to a passive wireless antenna sensor mounted on the structure, wherein the interrogation signal includes frequencies in a frequency range, wherein the frequency range includes a resonant frequency of the passive wireless antenna sensor, wherein the passive wireless antenna sensor is configured such that a change in the condition of the structure will change the resonant frequency;
a receiving device that is configured to:
receive a backscattered signal, wherein the backscattered signal comprises an antenna backscattered signal from the passive wireless antenna sensor and a structure backscattered signal, wherein and the antenna backscattered signal is modulated by the passive wireless antenna sensor at a modulated frequency;
detect a an envelope of the backscattered signal;
normalize an envelope;
determine a frequency of a normalized envelope that is associated with a reference amplitude;
determine a frequency shift based on a difference between frequencies of normalized envelopes at different times at the reference amplitude; and
determine the condition of the structure based on the frequency shift.

12. The apparatus of claim 11, wherein the frequency of the interrogation signal increases over time.

13. The apparatus of claim 12, wherein the frequency of the interrogation signal increases linearly over time.

14. The apparatus of claim 11, wherein the change in the condition of the structure includes a change in strain on the structure.

15. The apparatus of claim 11, wherein the receiving device is configured to apply a band pass filter to the envelope.

16. The apparatus of claim 11, wherein the receiving device is configured to convert the envelope to an amplitude-frequency curve.

17. The apparatus of claim 11, wherein the receiving device is configured to convert the envelope from a time domain to a frequency domain.

18. A system for monitoring a condition of a structure, comprising:
a transmitting device that is configured to transmit an interrogation signal, wherein the interrogation signal includes frequencies in a frequency range;
a network of passive wireless antenna sensors mounted on the structure, wherein each of the network of passive wireless antenna sensors has a different initial resonant frequency and is associated with a different location on the structure, wherein the frequency range includes each of the different initial resonant frequencies, wherein each of the network of passive wireless antenna sensors is configured such that a change in the condition of the structure at the location of one of the network of passive wireless antenna sensors will change at least one of:
the initial resonant frequency of the one of the network of passive wireless antenna sensors at the location on the structure; and
an initial amplitude of the one of the network of passive wireless antenna sensors at the location on the structure;
a receiving device that is configured to receive a backscattered signal, wherein the backscattered signal includes an antenna backscattered signal from the network of passive wireless antenna sensors and a structure backscattered signal; and
a processing device configured to:
determine a measured resonant frequency and a measured amplitude for each of the network of passive wireless antenna sensors from the backscattered signal;
determine, for at least one of the network of passive wireless antenna sensors, at least one of:
a resonant frequency shift between the measured resonant frequency and the initial resonant frequency of the at least one of the network of passive wireless antenna sensors; and
a return loss between the amplitude at the identified resonant frequency and the amplitude at the initial resonant frequency of the at least one of the network of passive wireless antenna sensors; and
determine the condition of the structure at a location on the structure based on:
the determined at least one of the resonant frequency shift and the return loss of the at least one of the network of passive wireless antenna sensors; and
the location of the at least one of the network of passive wireless antenna sensors.

19. The system of claim 18, wherein frequency division is used to multiplex the interrogation signal that is transmitted to the network of passive wireless antenna sensors.

20. The system of claim 18, wherein determine the condition of the structure includes formation of a crack.

* * * * *